(12) United States Patent
Bock

(10) Patent No.: US 7,465,247 B2
(45) Date of Patent: Dec. 16, 2008

(54) DIFFERENTIAL FOR A VEHICLE AXLE

(75) Inventor: Alois Bock, Hutthurm (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 227 days.

(21) Appl. No.: 11/632,265

(22) PCT Filed: Jun. 11, 2005

(86) PCT No.: PCT/EP2005/006282

§ 371 (c)(1),
(2), (4) Date: Jan. 11, 2007

(87) PCT Pub. No.: WO2006/007903

PCT Pub. Date: Jan. 26, 2006

(65) Prior Publication Data

US 2007/0287570 A1    Dec. 13, 2007

(30) Foreign Application Priority Data

Jul. 17, 2004    (DE) .................. 10 2004 034 736

(51) Int. Cl.
F16H 48/06    (2006.01)
F16H 57/02    (2006.01)

(52) U.S. Cl. .................... 475/230; 74/606 R

(58) Field of Classification Search ................. 475/220, 475/230, 248, 331; 74/606 R
See application file for complete search history.

(56) References Cited

U.S. PATENT DOCUMENTS

| 4,125,026 | A | 11/1978 | Torii et al. | |
| 5,533,423 | A | 7/1996 | Stehle et al. | |
| 6,045,479 | A | 4/2000 | Victoria et al. | |
| 6,656,079 | B2 | 12/2003 | Eulenstein et al. | |
| 7,056,255 | B2 * | 6/2006 | Hay | 475/220 |
| 7,261,664 | B2 * | 8/2007 | Szuba | 475/230 |
| 2004/0116235 | A1 | 6/2004 | Szuba | |

FOREIGN PATENT DOCUMENTS

| DE | 26 53 978 | 6/1978 |
| DE | 43 17 073 A1 | 11/1994 |
| DE | 100 13 429 C1 | 7/2001 |
| DE | 102 38 236 A1 | 3/2004 |
| EP | 0 979 960 A1 | 2/2000 |
| FR | 2682732 A1 * | 10/1991 |

* cited by examiner

Primary Examiner—Roger Pang
(74) Attorney, Agent, or Firm—Davis Bujold & Daniels, P.L.L.C.

(57) ABSTRACT

A differential gear device (1) for a vehicle axle, having a differential carrier (2) and a differential lid (5), which are connected to a crown wheel. The differential carrier (2) is connected to the differential lid (5) and crown wheel (6) by a radial weld seam (7, 7').

6 Claims, 2 Drawing Sheets

DIFFERENTIAL FOR A VEHICLE AXLE

This application is a national stage completion of PCT/EP2005/006282 filed Jun. 11, 2005, which claims priority from German Application Ser. No. 10 2004 034 736.0 filed Jul. 17, 2004.

FIELD OF THE INVENTION

The present invention concerns a differential gear device for a vehicle axle.

BACKGROUND OF THE INVENTION

Compensating gearboxes and/or differential gear devices are known in the prior art. They allow a differential number of revolutions of the wheels when taking a curve, for example. For this purpose, the differential carrier is traditionally driven by a bevel gear or spur gear, which meshes with a crown wheel or spur gear. Furthermore, two, and if required, four compensating gears mounted on a bolt and/or differential carrier in a rotatable manner are defined, which mesh with both drive axle bevel gears that are permanently attached to the drive shaft, and which are connected to the wheel head.

In the case of more than two differential pinions or for increased strength, differential casings are traditionally arranged in two parts, comprising a differential carrier and a differential lid screwed to the crown wheel. The required screw connection unfavorably increases the weight of the differential gear device, as well as the required installation space.

From U.S. Pat. No. 4,125,026, a differential gear device is known, where the crown wheel is joined to the differential carrier and/or differential lid by way of electron beam welding so that a screw connection is avoided. With this method, a weld seam is required for each connection.

The aim of the present invention is the disclosure of a differential gear device that is optimized in relation to the differential gear devices known in the prior art with regard to manufacturing costs and weight. In particular, the connection between the parts of the differential gear device should be improved.

SUMMARY OF THE INVENTION

A differential gear device is proposed whereby the differential carrier is connected to the differential lid and crown wheel by way of only one radial weld seam, preferably performed by laser welding methods.

According to the present invention, the differential carrier is arranged so that it has various recesses in its circumference in the flange area of the crown wheel, according to the present invention, the differential lid has segments corresponding to recesses, which mesh with the recesses of the differential carrier so that the differential lid likewise comes into contact with the crown wheel.

The amount of segments/recesses depends on the outline conditions, for example, strength considerations, welding method, etc., and may be selected arbitrarily taking into account these outline conditions. The segments and recesses are preferably cast manufactured without machining.

With the concept according to the present invention, only one operation is favorably required for the connection of the differential carrier, differential lid and crown wheel/spur gear. Furthermore, the manufacturing and mounting costs are reduced by the elimination of the screw connection. Moreover, the weight of the differential gear device is reduced by the lower amount of required materials, because winding and screws are eliminated.

BRIEF DESCRIPTION OF THE DRAWINGS

The invention will now be described, by way of example, with reference to the accompanying drawings in which.

DETAILED DESCRIPTION OF THE INVENTION

Figure 1:
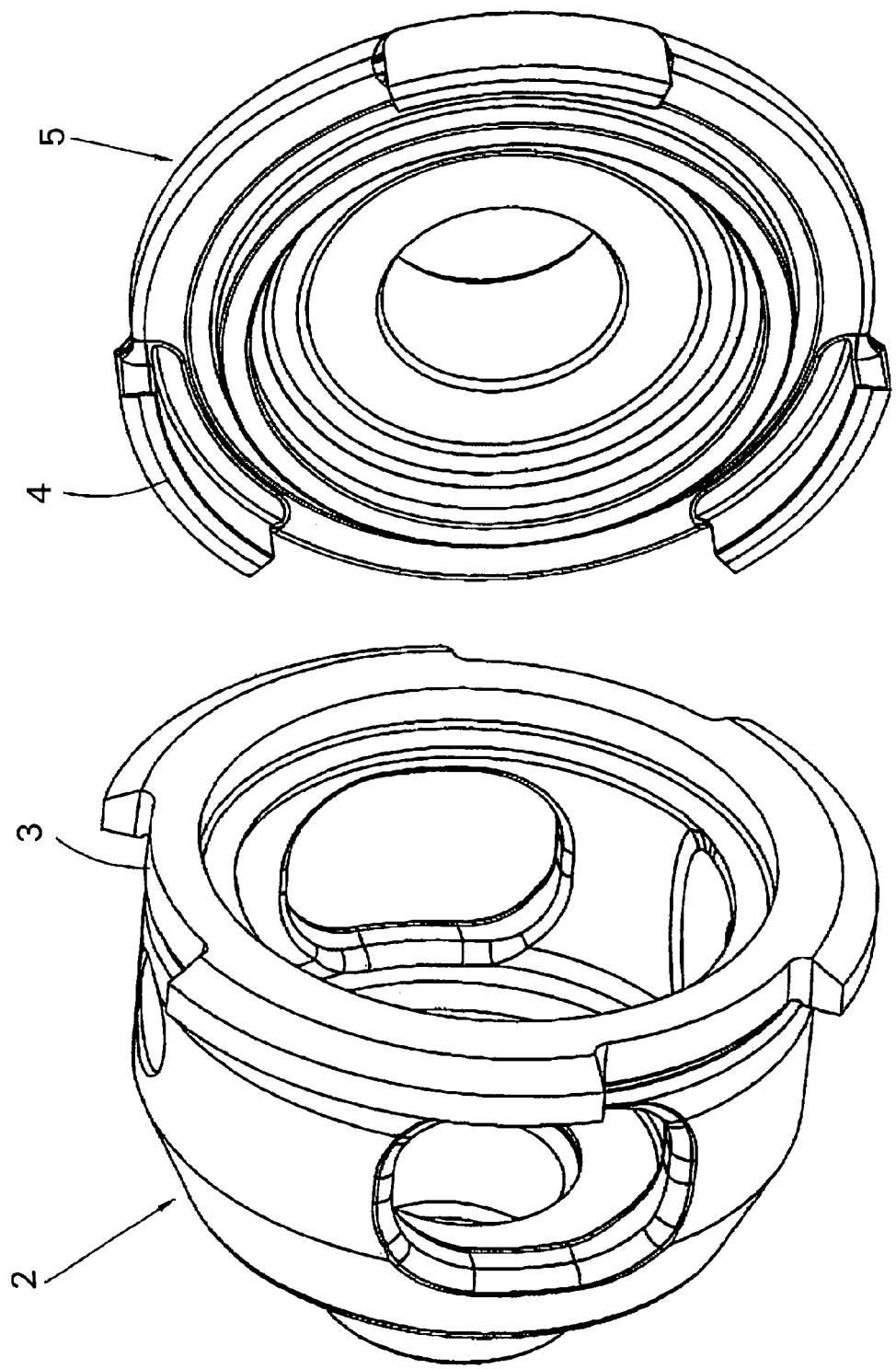
FIG. 1 is a perspective schematic view of the embodiment of the differential carrier and differential lid according to the present invention.

According to FIG. 1, a differential carrier 2 of a differential gear device 1 according to the present invention discloses recesses 3 on its perimeter in the flange area of a crown wheel 6. These recesses 3 are arranged for the admission of segments 4 of a differential lid 5 of the assembled and mounted differential gear device 1. Through this construction, the differential carrier 2, as well as the differential lid 5 comes into contact with the crown wheel 6 (not illustrated in the drawing), so that the differential carrier 2 and the differential lid 5 and crown wheel 6 are connected to each other by only one radial weld seam.

Figure 2:
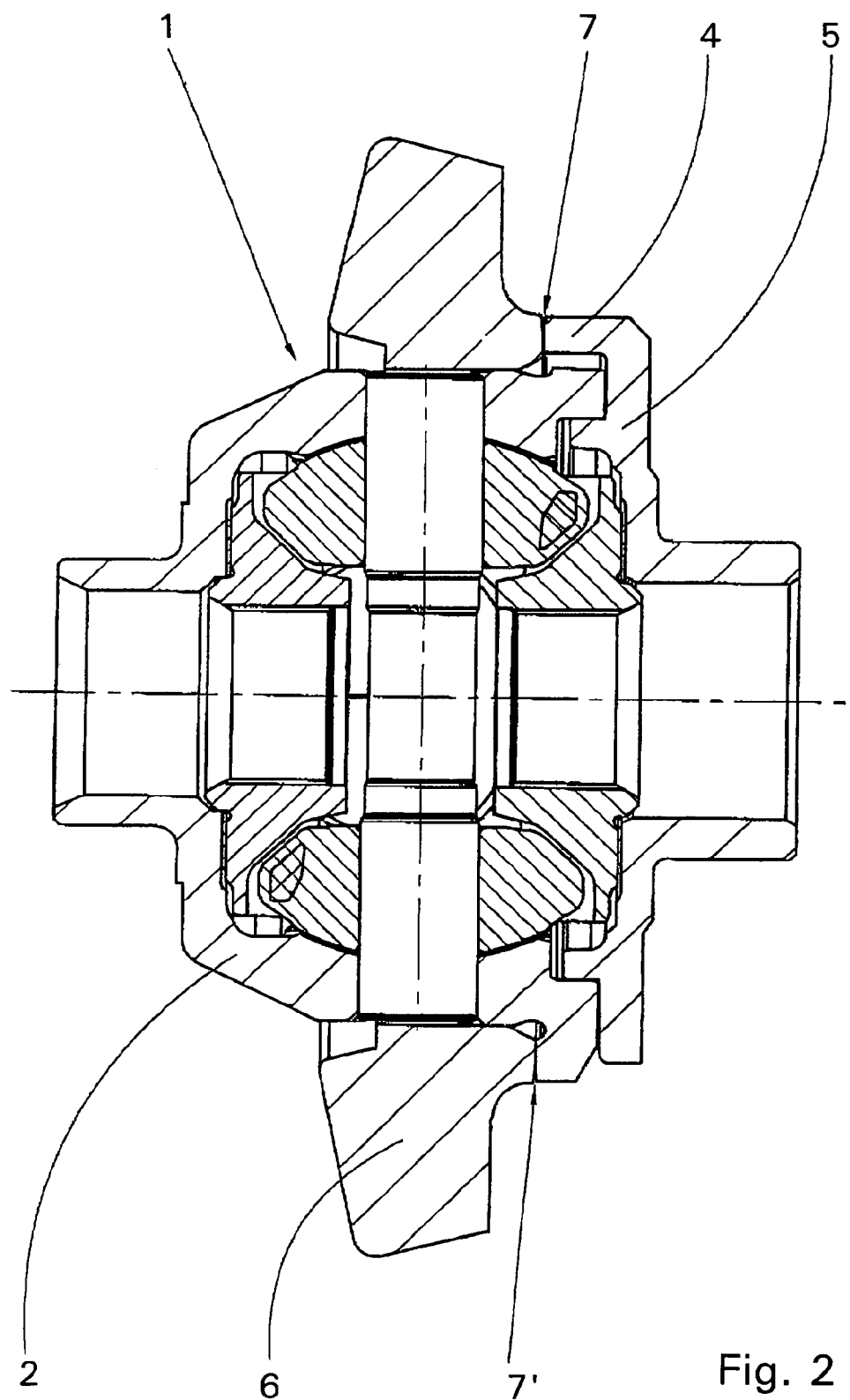
FIG. 2 is a schematic section view of a differential gear device according to the present invention.

The subject matter of FIG. 2 is the assembled differential gear device 1, according to the present invention. It is thus clear that the differential carrier 2, differential lid 5 and crown wheel 6 are joined together by a radial weld seam 7, 7'. Part 7 of the weld seam, illustrated in the upper part of FIG. 2, connects the segment 4 of the differential lid 5 to the crown wheel 6, and part 7', illustrated in the lower part of FIG. 2, connects the differential carrier 2 to the crown wheel 6.

According to the present invention, it is also possible that the recesses 3 are arranged in the differential lid 5, whereby the segments 4 are arranged in the differential carrier 2 in this case.

The present invention is not limited to the illustrated embodiment. It comprises all embodiments of a differential gear device, in particular the proportions between the size of the differential carrier and the differential lid falling within the scope of the present claims, without affecting the advantages of a differential gear device, as mentioned in the claims, even if these embodiments are not explicitly illustrated in the drawings or description.

REFERENCE NUMERALS 1 differential gear device
2 differential carrier
3 recess
4 segment
5 differential lid
6 crown wheel
7 radial weld seam
7' radial weld seam

The invention claimed is:

1. A differential gear device for a vehicle axle, the differential gear device comprising a differential carrier and a differential lid, the differential carrier and the differential lid being connected to one of a crown gear (6) and a spur gear, the differential carrier (2) being connected to the differential lid (5) and the crown gear (6) by a weld seam (7, 7'), one of the differential carrier (2) and the differential lid (5) having recesses (3) on a perimeter thereof which respectively mesh with segments (4) of one of the differential lid (5) and differential carrier (2).

2. The differential gear device for a vehicle axle according to claim 1, wherein the recesses are adjacent flanges of unit of the crown gear (6) that the differential carrier (2) and the differential lid (5) contact the crown gear (6) such that the differential carrier (2), the differential lid (5) and the crown gear (6) are each connected by a single weld seam (7, 7').

3. The differential gear device for vehicle axles according to claims 1, wherein the weld seam (7, 7') is a radial weld seam and is formed by a laser welding method.

4. The differential gear device for a vehicle axle according to claim 2, wherein the segments (4) and the recesses (3) are cast manufactured without machining.

5. The differential gear device for a vehicle axle according to claim 2, wherein a number of the segments (4) and the recesses (3) are selected taking into consideration outline conditions dependant on strength considerations and a welding method employed to form the single weld seam (7, 7').

6. The differential gear device for a vehicle axle according to claim 2, wherein the weld seam is arranged radially about differential gear device and at a right angle to a rotation axis of the crown gear (6).

* * * * *